United States Patent [19]
Konsmo et al.

[11] Patent Number: 5,844,808
[45] Date of Patent: Dec. 1, 1998

[54] APPARATUS AND METHODS FOR MONITORING AND COMMUNICATING WITH A PLURALITY OF NETWORKED REMOTE VENDING MACHINES

[76] Inventors: Øystein Konsmo, 1037 N. Las Lomitas Rd., Tucson, Ariz. 85704; Finn Staff, Svarttrostv, 29, N-0393, Oslo, Norway

[21] Appl. No.: 718,386

[22] PCT Filed: Mar. 30, 1995

[86] PCT No.: PCT/NO95/00060

§ 371 Date: Nov. 21, 1996

§ 102(e) Date: Nov. 21, 1996

[87] PCT Pub. No.: WO95/27242

PCT Pub. Date: Oct. 12, 1995

[30] Foreign Application Priority Data

Mar. 30, 1994 [NO] Norway .................................... 941202

[51] Int. Cl.⁶ .................................................. G06F 17/00
[52] U.S. Cl. .................. 364/479.14; 364/479.11; 364/479.12; 364/470.2; 379/32; 379/52; 379/93.31; 379/100.25; 379/106.06
[58] Field of Search ......................... 364/479.14, 479.11, 364/479.12, 708.1, 709.12, 470.02, 470.11; 371/32, 47.1; 379/32, 106.06, 93.31, 100.05; 370/360; 341/91; 704/200

[56] References Cited

U.S. PATENT DOCUMENTS

| | | | |
|---|---|---|---|
| 2,590,736 | 3/1952 | Tandler et al. ............................. | 149/10 |
| 4,143,749 | 3/1979 | Otten ........................................ | 194/218 |
| 4,282,575 | 8/1981 | Hoskinson et al. ................ | 364/479.08 |
| 4,412,292 | 10/1983 | Sedam et al. ....................... | 364/479.11 |
| 4,491,140 | 1/1985 | Eglise et al. .............................. | 453/17 |
| 4,766,548 | 8/1988 | Cedrone et al. .................... | 364/479.06 |
| 5,013,896 | 5/1991 | Ono ......................................... | 235/381 |
| 5,091,713 | 2/1992 | Horne et al. ....................... | 364/479.06 |
| 5,207,784 | 5/1993 | Schwartzendruber ...................... | 221/6 |
| 5,212,774 | 5/1993 | Grider et al. ........................... | 395/309 |
| 5,235,634 | 8/1993 | Oliver ................................. | 379/106.06 |
| 5,282,127 | 1/1994 | Mii ........................................ | 364/130 |
| 5,324,922 | 6/1994 | Robrts ..................................... | 235/375 |

FOREIGN PATENT DOCUMENTS 0 572 119 A3  12/1993  European Pat. Off. .

*Primary Examiner*—Paul P. Gordon
*Assistant Examiner*—McDieunel Marc
*Attorney, Agent, or Firm*—Patterson & Keough, P.A.

[57] ABSTRACT

Devices and methods to monitor a distributed system for supplying goods or services and to generate messages concerning the state of the system and the supplied goods or services, Two-way communication within the system occurs between remote local units and a host computer in a control and information processing center. The local units are equipped with a microcontroller with a memory coupled to a plurality of sensors that detect the occurrence of and provide information regarding specified events, such as sales of goods, unauthorized entry into the local unit, and notification of low inventory stock.

31 Claims, 5 Drawing Sheets

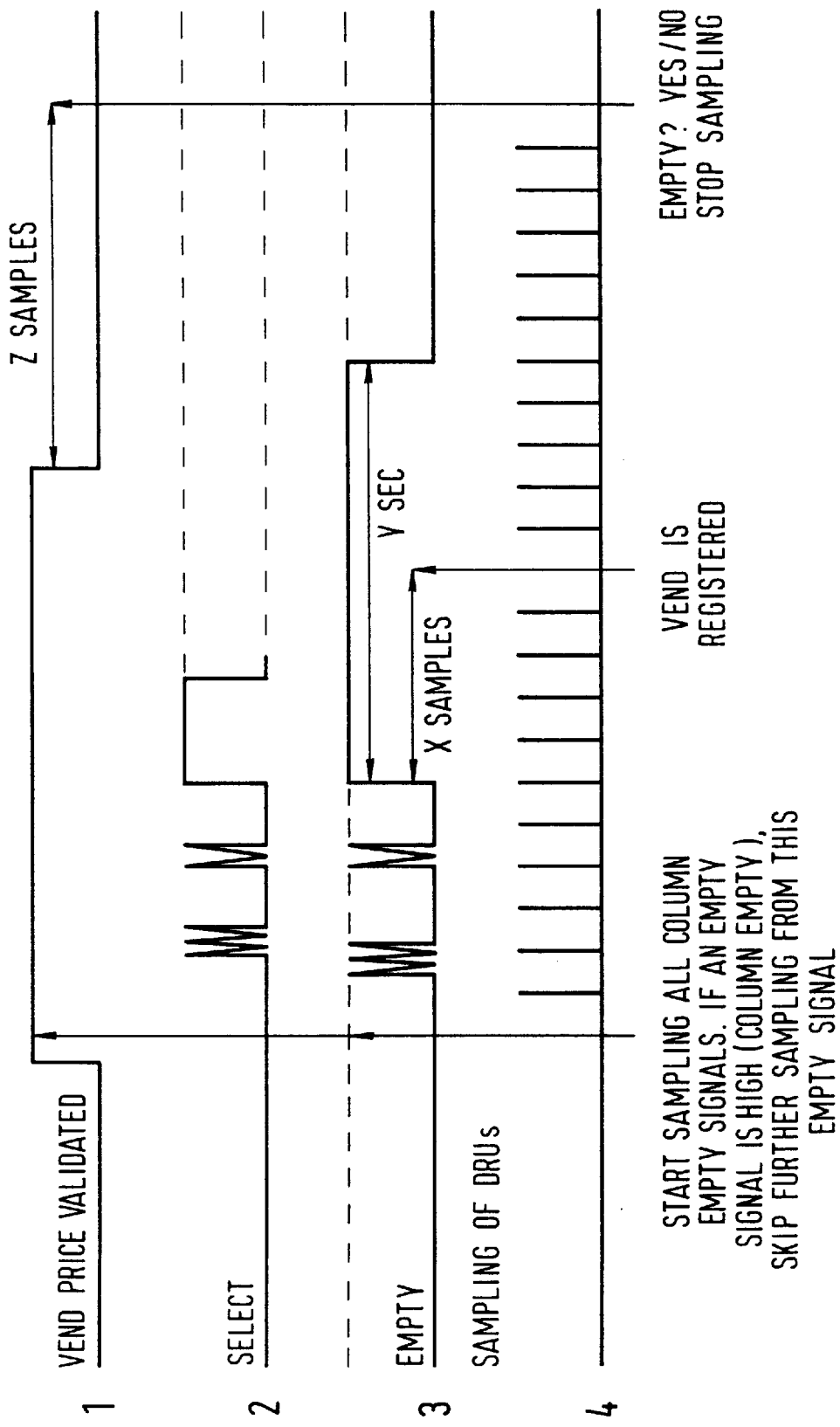

APPARATUS AND METHODS FOR MONITORING AND COMMUNICATING WITH A PLURALITY OF NETWORKED REMOTE VENDING MACHINES

CROSS-REFERENCE TO RELATED APPLICATION

This application is directed to subject matter that is related to the subject matter of International Application No. PCT/NO95/00060, filed Mar. 30, 1995, priority to which is claimed under 35 U.S.C. § 120.

BACKGROUND OF THE INVENTION

1. Field of the Invention

The invention concerns measures and actions in a sophisticated information system in which two-way communication is employed between local units and a host computer in a control and information processing center. The invention particularly concerns a method for monitoring a distributed system for supplying goods or services and for generating messages concerning the state of the system and the supplied goods or services, wherein the system comprises a plurality of local units for supplying goods and services, particularly vending machines, wherein each local unit comprises sensors for detection of specified events in the local unit, wherein each local unit comprises a microcontroller with a memory, and wherein each microcontroller is connected to the sensors and via a communication system with a host computer in a control center. The invention also concerns a method for recording signals from an electronic coin unit in a local unit, particularly a vending machine. The invention further concerns a method for recording and generating alarm messages in the event of an unauthorized intrusion in a local unit, particularly a vending machine. In addition the invention concerns a method for filling/refilling of commodities in a vending machine. Finally the invention also concerns a device in a local unit, particularly a vending machine, in a distributed system for for goods and services, wherein the distributed system is monitored and messages generated concerning the state of the system and the supplied goods and services by means of the method, wherein the vending machine comprises a number of sensors for detection of specified events in the vending machine, together with an electronic coin unit and a microcontroller with a memory, wherein the microcontroller is connected to the sensors and the coin unit, wherein a method is used in recording signals from the electronic coin unit, and wherein the microcontroller via a communication system is connected with a host computer in a control center.

2. Description of Related Art

It is known in the prior art to link a system of local units for supplying goods or services to a central computer via a communication system in order to monitor the local units and transfer data concerning their state to the central computer. Such a system is known, for example, from U.S. Pat. No. 4,412,292, where a system is disclosed for remote monitoring of a vending machine in order to automatically report the states of the vending machines to a central computer. Each vending machine is provided with a microprocessor which monitors and stores data which are generated in the vending machine and transfers the data, for example over a telephone line, to the central computer, either in real time or at routine call times. The decentralized logic between the vending machine's microprocessors and the central computer is implemented in order to provide different alarm functions as well as to provide a stock check and efficient route planning for supply and maintenance of the vending machines. One drawback of this known system is the use of a telephone line for communication, since it requires a dedicated telephone line and this represents increased operational costs as well as installation problems. Moreover, this known system is supplied with a high voltage interface with the vending machine's control circuits and this also contributes to an increase in the costs for the system.

Furthermore from U.S. Pat. No. 4,766,548, there is known a microprocessor-controlled system for monitoring, storing and periodically reporting data concerning the commercial operation of vending machines, particularly a vending machine for soft drinks, to a central computer for collecting and monitoring data. According to this system, data are transferred over a telephone line which is accessed by the control system on a non-dedicated basis.

What the known systems have in common is that the known per se methods which are used for controlling monitoring systems for vending machines, as illustrated by the above-mentioned prior art, are highly hardware-orientated, i.e. adapted to the units and equipment of the systems concerned and the technical possibilities which are thereby offered.

In recent years distributed systems for supplying goods and services have become increasingly widespread. Such distributed systems comprise a plurality of local units for supplying the product or service, these local units being connected to a central control system via a communication network which can comprise the dedicated lines or use existing, public communication networks. These distributed systems comprise not only vending machines, but also, for example, service terminals, where the services offered can be payment services, information services or ordering services. Examples of such service terminals may be minibanks, card and coin telephone systems and payment terminals.

Thus today's telephone systems per se also represent an example of a distributed system for supplying goods and services, since it is possible to use the telephone as an ordering terminal for a product and service as well as paying for the product and service from the telephone. When non-dedicated systems are used for procuring goods and services apart from those for which they were normally used previously, the monitoring and control is generally restricted to the communication routines, i.e. recording of the period of the call and debiting. To a certain extent the same applies to other types of service terminals which are seldom connected to a control system for real time monitoring and generating of messages about the operation and state of the terminals.

SUMMARY OF THE INVENTION

Thus it is a first object of the present invention to indicate measures and actions which result in an advanced and generally useful information system with added value and based on two-way communication between local units which form part of a distributed system and a host computer in a control and information processing center.

A second object of the invention is that it should not be dependent on the software used which is included in the distributed systems for supplying goods and services and thus it is a further object that this should be achieved by measures and actions according to the present invention being adapted to the system wherein the invention is used in operations which are conducted from and via the central computer or host computer and where instructions and commands are transferred to the local unit via a communication system which is also non-dedicated, but which can be any available communication system.

A third object of the present invention is that those functions which can be offered by a control and information system for a distributed system for supplying goods and services should be able to be implemented with a high degree of freedom of choice and in reality only be limited by those possibilities for obtaining information which are available in the local units.

It is also an object of the present invention to provide a control device which can be used in the local units in a distributed system for supplying goods and services, without the need for the control device to be dedicated to the system concerned or to undergo comprehensive modifications before it can be employed. Thus it is particularly a further object that the control device should be of a universal and commonly used type and therefore be able to be adapted to local units in the form of vending machines and service terminals, regardless of how they are designed otherwise, and in addition should be capable of being arranged in order to perform a two-way communication with a central host computer via existing and available communication systems according to whether this is expedient.

A fourth object of the present invention is to develop an interactive system for generating and transferring messages, wherein all the system parameters are set and controlled from a host computer, while at the same time for the two-way communication a wireless communication network is used in which a plurality of local units can communicate with the host computer simultaneously. This means that measures and actions according to the present invention can serve distributed systems which comprise several thousand local units for supplying goods and services and provide a more or less complete survey of their operation in approximate real time.

A fifth object of the present invention is that the interface between the microcontroller and the local unit should be as simple and reliable as possible with a minimum of physical connections and without employing any devices apart from those which already form part of the local unit.

A sixth object of the present invention is that it is orientated towards the type of goods and services which are to be sold or supplied and it particularly applies where the local units are vending machines and the goods which are supplied are physical items, thus enabling the present invention at all times to keep a check on, for example, sales data and inventories and permit optimum routines for refilling and servicing of the local units.

Finally, it should be mentioned that the present invention is software-orientated, i.e. those measures and actions which characterize the invention can be realized in the form of software-orientated control routines and programme modules in the microcontrollers, thus enabling software components and cable-dependent logic to be reduced to a minimum and even be entirely eliminated, whereby substantial reductions in costs will become possible.

The above-mentioned and other objects are achieved according to the present invention with a method which is characterized by defining in each local unit those events which are to be monitored, those messages which are to be generated, when the messages should be generated and when the messages are to be transferred from the local unit to the host computer, these definitions being stored in each local unit's microcontroller in the form of a message matrix which can be accessed from the host computer, assigning at least one sensor for monitoring and recording of a defined event, assigning an absolute or relative threshold value for each defined event, storing the assigned threshold values in the microcontroller in each local unit, comparing the numerical value of a detection signal output by a sensor with the assigned threshold value, stating on the basis of the comparison and according to a predetermined execution routine whether the value of the detection signal is respectively greater than, equal to or less than the assigned threshold value, generating a message on the basis of the comparison, transferring the message from the microcontroller to the host computer in the control center via the communication system, updating a database stored in the host computer on the basis of the content of the message, said database being part of an information system for the local units and their operation, and initiating measures directed to the operation of the local units on the basis of the received message and with regard to predefined conditions stored in the host computer.

The present invention further comprises a method which is characterized in that it includes steps for recording by means of the sensors a signal which represents the value of a received coin, recording a signal which represents the value of a change coin, and recording a signal which represents the type of sale, the register for the amount of change coins, the register for the value of the amount of cash and the register for the cash value acquired during the sale being simultaneously respectively updated on the basis of the signals transmitted from the coin units.

A further method according to the present invention is characterized in that it comprises the following successive steps:
  registering the time of an interruption of the power supply to the local unit, an interruption of the power supply being effected by opening the local unit while the power supply to the microcontroller is simultaneously maintained,
  activating the control mechanism, the activation of the control mechanism placing the microcontroller in a service mode,
  effecting the emission of an optical and/or acoustic signal in the local unit,
  recording the time of the activation of the control mechanism and generating an alarm message if the activation does not take place within a predetermined time interval from the time of the recording of the power interruption,
  reading the identification unit in the reader way and generating an alarm message if the identification unit has not been read within a predetermined time interval from the time of the activation of the control means,
whereupon measures in connection with the operation of the local unit and its maintenance may be initiated on the spot, said measures being concluded by once more activating the control device for placing the microcontroller in an operating mode and generating an alarm message if the microcontroller has not been reset to the operating mode within a predetermined time interval from the time when it was placed in the service mode.

Yet another method according to the present invention is characterized in that it comprises steps for specifying total commodity capacity of the spare store, assigning a given priority to a commodity, the priority determining according to predetermined conditions which goods should be refilled in the spare store if its capacity is not sufficient to contain a predetermined number of every commodity found in the vending machine, specifying the maximum inventory in each storage compartment in the sales store and transferring the specification to the microcontroller for storing in its memory, specifying the type of commodity which is contained in each storage compartment in the sales store and transferring the specification to the microcontroller for storing in its memory, defining a minimum unit used for filling a commodity and transferring the definition to the microcontroller for storing in its memory, estimating the expected sales of a commodity in the period of time from a message about the inventory of the said commodity being transferred from the microcontroller up to the succeeding filling of the commodity, the said estimate forming the basis of a decision about the number of units of the commodity which are to be filled, and further in connection with filling of commodities to record the number of filled units of a commodity in the sales store and the spare store by means of the microcontroller and transfer the number of units filled in the storage spaces from the microcontroller to the host computer, recording the sales of a unit of the commodity and transferring the number of units of the commodity which are present after the sales to the host computer and storing the number of sales per type of commodity in the memory of the microcontroller, a first register of the microcontroller being updated with sales data for each commodity between the filling of the commodity and a second register of the microcontroller being updated with sales data for each commodity between each time sales data are transmitted to the host computer.

A device in a local unit, particularly a vending machine, is characterized according to the present invention in that the coin units are connected to the microcontroller via a serial interface or a bus interface in order to determine the type of coin, the insertion of a coin in the coin unit, the delivery or return of coins from the coin unit, the microcontroller comprising a first detector for detecting a validation of sales price in the coin unit, a second detector for detecting the sale of a commodity, a third detector for detecting whether the inventory of a type of commodity is below a level which indicates that the vending machine is about be emptied with respect to the said type of commodity and for detecting when the vending machine is empty of the said type of commodity, as well as a fourth detector in order to detect the amount of change coins in the coin unit, the microcontroller, if the amount of change coins is low or equals zero, generating a signal which informs a user of the vending machine.

BRIEF DESCRIPTION OF THE DRAWINGS

The invention will now be explained in more detail in connection with a brief description of a distributed system for supplying goods and services where the invention is used and in connection with the accompanying drawing, in which FIG. 3 is a block diagram of a device in a local unit and FIG. 4 illustrates schematically a signal interface for the device in the local unit.

DETAILED DESCRIPTION OF PREFERRED EMBODIMENTS

Figure 1:
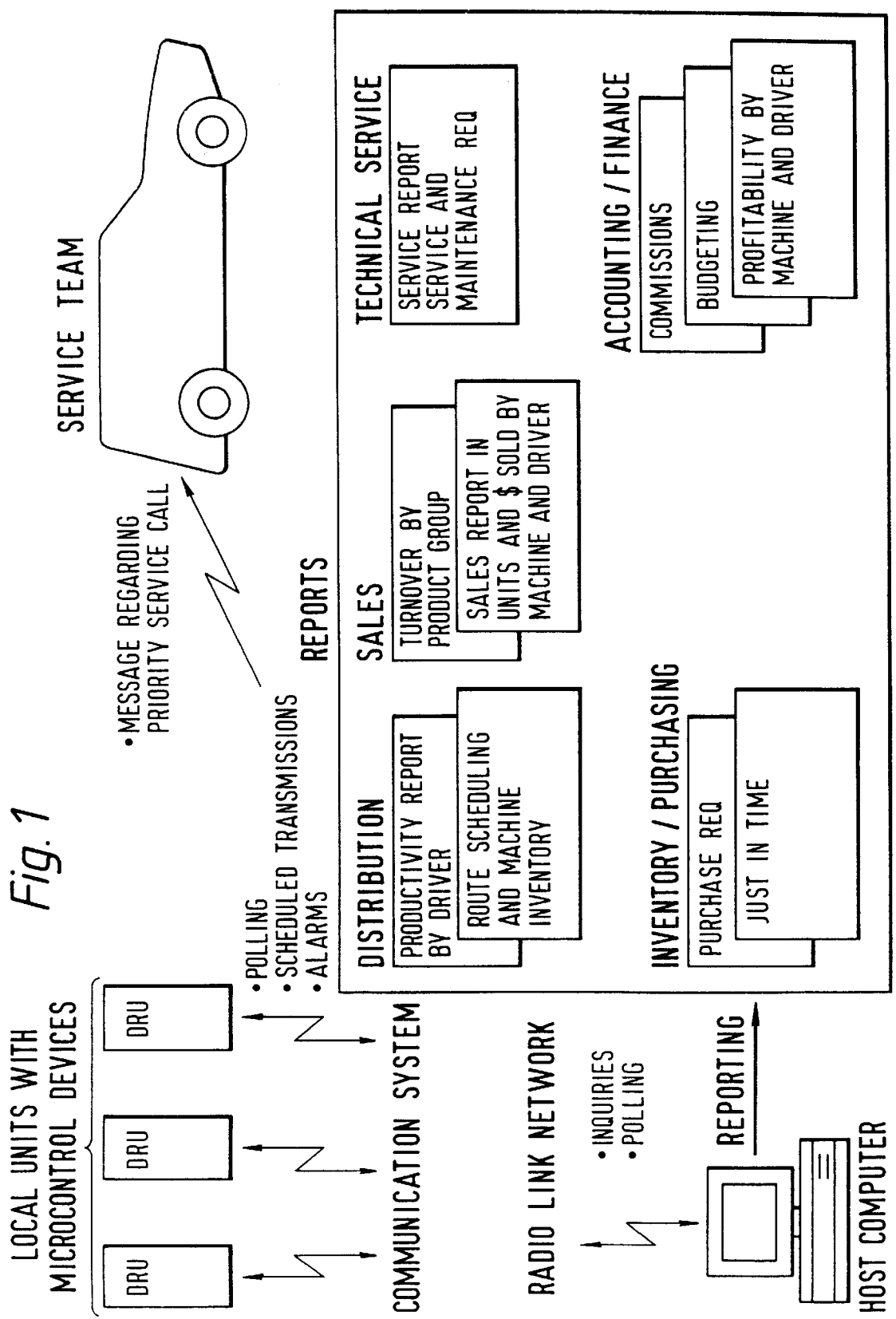
FIG. 1 is a schematic outline of a distributed system where the present invention is used, FIGS. 2(a–b) is a schematic illustration of the information flow in a host computer as used in the present invention.

By way of the present invention an information system is provided which is based on a two-way communication between a number of decentralized units for supplying goods and services, hereinafter called local units, and a host computer in a control center, wherein the information collected from the local units is processed. With reference to FIG. 1 a description will now be given of a distributed system for supplying goods or services and in which the present invention is used.

The system as illustrated in FIG. 1 comprises a number of local units which are connected via a communication network with a central computer in a control center. The local units may, e.g., be vending machines where a user by means of a means of payment, for example coins, banknotes or credit card, can purchase goods, but the local units can also be service terminals, for example coin telephones, user-operated payment terminals or terminals for obtaining information, and payment for the commodity or service need not be made directly, but can be implemented by the user authorizing the system in such a manner that it is debited via some kind of system for electronic payment to which the distributed system in this case is connected.

Each of the local units comprises a microcontroller which is preferably a universal microcontroller which can be easily installed in most local units without extensive installation costs. The microcontrollers comprise, for example, a processor and a memory and are implemented as program-controlled control devices.

Each of the microcontrollers in the local units is connected via a communication network to a host computer in a control center. In this manner the host computer via the microcontroller can monitor and receive messages about events in the local units. Since the local units can be very varied and comprise a number of types of equipment for supplying goods and services, the microcontroller is connected according to requirements to the equipment in the local unit via one or more interfaces which automatically record and collect data concerning these events. The interfaces can be serial, digital or analog. Furthermore the microcontroller will be connected to an external modem for transferring information via a communication network. Since it is desirable to use those communication networks which are available, either based on radio lines or cable-dependent, an external modem is used and the microcontroller therefore does not include an integrated modem circuit. As already stated, the microcontroller includes a memory which is actually implemented by means of several specific components for storing system software, parameters for updating and data which are received via the interfaces or recorded by external sensors. Data from the microcontroller are transferred on the communication network used from the local unit via the installed modem to the host computer.

Figure 2A:
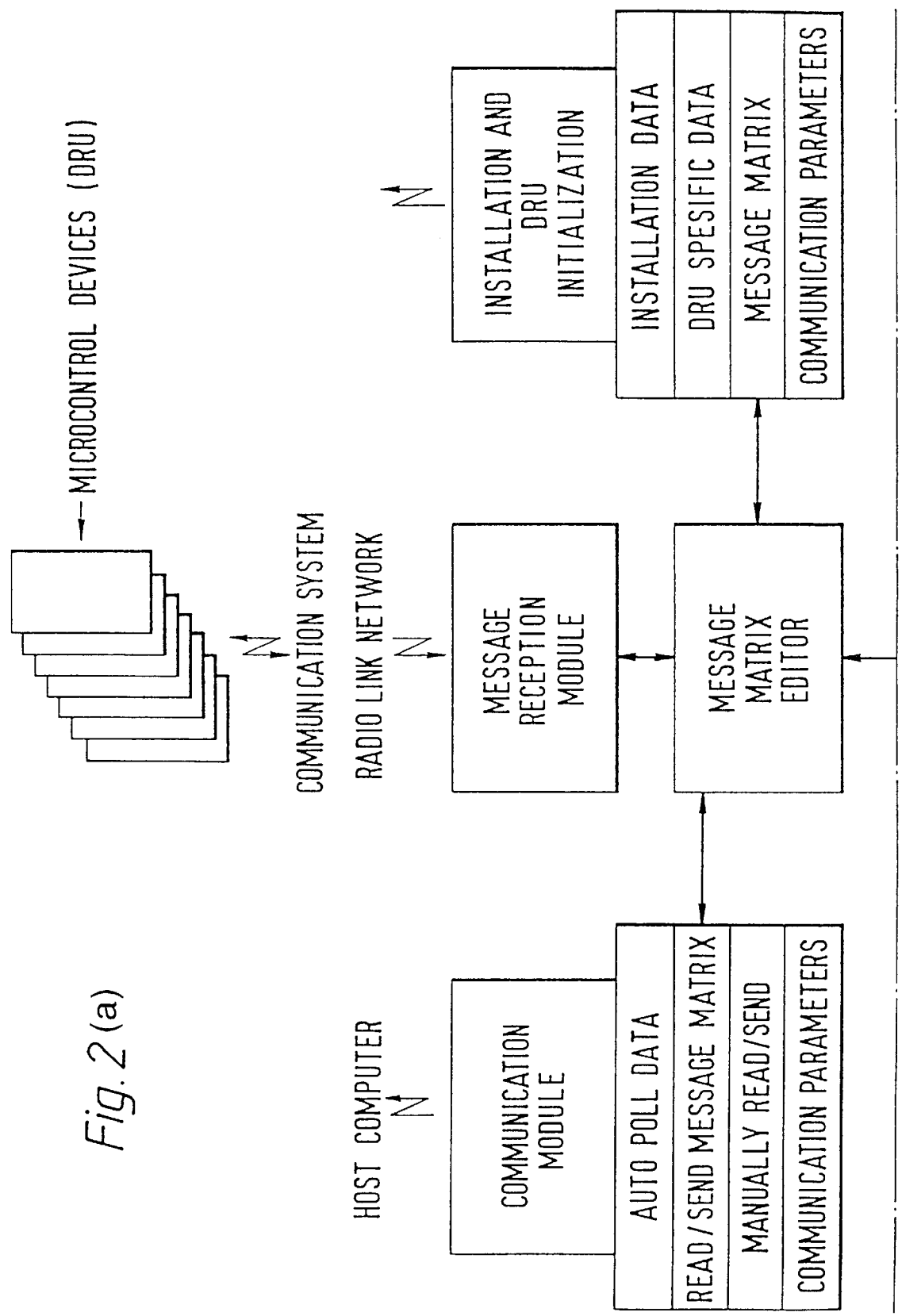
Figure 2:
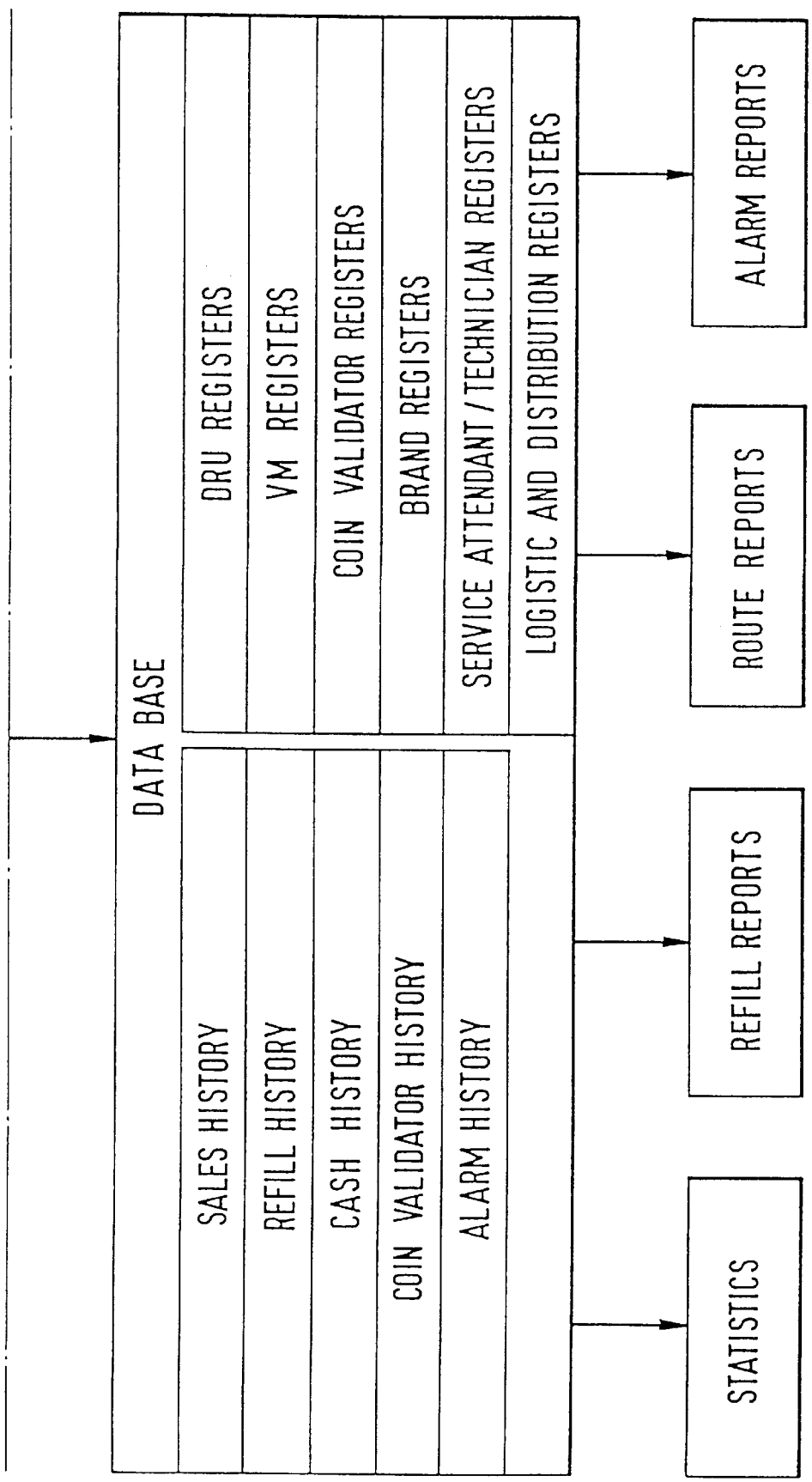

The actual host computer can be based on a personal computer consisting of an input-output server for communication and a file server, the host computer's storage capacity being dependent on the application. According to requirements, technology can naturally be implemented which is adapted to applications for large systems. The host computer works with a normal operating system, but preferably one which permits several tasks to be performed simultaneously. For example, several microcontrollers should be able to communicate with the host computer simultaneously. The information flow in the host computer is illustrated schematically in FIG. 2. The software in the host computer is composed of several modules, only one communication module and a so-called message matrix module being partially independent of the system application. The remaining software is adapted to the distributed system for supplying goods and services in which the present invention is used. The host computer can poll the local units via the communication network and transfer data to the microcontrollers via a data transfer module. The host computer receives messages and information from the local units as a result of polling, programmed or predetermined transfers and alarms which are transmitted when an abnormal state is recorded in one of the local units. For its part the host computer can generate reports, process the received data and enter them in a database which is stored in the host computer's memory as well as support and operate an information system for the distributed system for supplying goods and services. In this connection messages can be given via the host computer and the control center to operators who are servicing the local units. In this manner measures can be implemented which are aimed at the operation of the local units and their service and maintenance can be planned and controlled.

According to the invention the host computer defines those events which are to be monitored in the local unit, the messages which are to be generated in the local unit's microcontroller, when the messages are to be generated and when the messages should be transferred from the local unit to the host computer. These definitions are transferred via the communication system and are stored in the memory of the microcontroller in the local unit. These stored definitions constitute a so-called message matrix in the microcontroller and it can be accessed from the host computer. The message matrix which is used in the present invention will now be described in more detail. The message matrix is installed in each microcontroller before it can be put into operation and a specific message matrix can naturally be installed in a large number of microcontrollers if this is expedient.

The purpose of the message matrix is to define those events which are to be monitored, the messages which are to be generated, when the messages should be generated and when a message has to be transferred to the host computer. In this context an event should be understood to mean one or more signals, either analog or digital, which are generated by sensors in the local unit and connected to the microcontroller, signals transmitted by the sensors being delivered to the microcontroller via its interface. It should also be understood that this event can be due to activity in the local unit or its surroundings. Examples of such events can be machine error, power failure, coin handling and external parameter changes such as a temperature increase, etc. In the message matrix a code is a defined alphanumeric name which represents an event and a threshold is a defined numerical value which can compare with a register value linked to an event code or a suitable analog signal, while a message is generated every time the microcontroller finds that the numerical value in a corresponding register is equal to the threshold value. A message will also be generated when the microcontroller records that the analog value which is received through an analog channel is greater than, less than or equal to the corresponding threshold value respectively.

The message matrix is accessed in the host computer and all variable parameters are input via the host computer, whereupon the message matrix's parameters are transferred to the microcontroller. There is nothing to prevent a message matrix being edited from the host computer after it is installed on the microcontroller.

A message matrix comprises a number of documents and each document consists of several fields, including the code field which contains the abovementioned code consisting of alphanumeric characters which define the event which is to be monitored. The purpose of the code is to define variable registers which contain data which are connected with the event in question. It should be understood that each code corresponds to one or more specific events which may occur in the local unit. The message matrix must always include the code field.

Furthermore the message matrix also contains a threshold field. The threshold field contains alphanumerical characters which define when a message has to be generated. A threshold value can be absolute or relative and in the latter case the threshold value corresponds to an interval. The object of the threshold field is to enable a message to be generated when the corresponding variable register reaches the threshold level. Typical examples of an absolute threshold value can be when a collection of five identical events is recorded, for example in a vending machine five sales of a type of product or a scalar such as a temperature reading or the like. A relative threshold value of, e.g., five can mean that five identical events have occurred within a specified period of time or five errors in the local unit within a similarly specified period of time. A relative threshold value of five can, for example, also mean a temperature increase of five degrees in the course of a predetermined period of time, e.g. an hour. The use of the threshold field is optional. If no threshold is specified, the message type must be a so-called dump message which will be discussed in more detail below.

The message matrix also contains an optional interval field with alphanumerical characters which represent time units or a collected number in some register or other. An example of a time unit can be an hour or the accumulated number in a register, e.g. a thousand completed sales if the local unit is a vending machine or for example ten initializations of the local unit. The message matrix also comprises a type field which contains alphanumeric characters which define the message type. The object of the type field is to permit priority to be given to messages and decide whether a message should be transferred to a host computer. There are three message types. The first is an alarm message which is used to inform about the occurrence of a fault in the equipment which requires immediate action or that values have been recorded which necessitate the implementation of preventive maintenance or some other kind of service. When an alarm message is generated, it is transferred immediately to the host computer. Normally an alarm message will always be designated with the character A in the type field. An example of an alarm message can be a message that a vending machine has to be filled up immediately with a specific product.

A delayed message is a message type whose transfer to the host computer is dependent on whether or not a second event occurs in the local unit. An example of a delayed message is a message which is generated if, e.g., no sales signal is generated in a vending machine after a signal has been generated that payment has been disbursed corresponding to the sales price. In this case the message will only be transferred to the host computer if no second sale is recorded within a predetermined period of time. The latter would indicated that any problem connected to the first sale has been solved and the delayed message therefore does not need to be transferred, but is either erased or stored for possible subsequent retrieval. A delayed message is usually described with numerical characters which represent a delay in minutes.

Finally there is a dumping message which corresponds to events or activity in the local unit and which does not represent faults or problems in the local unit. Normally information concerning different functions of the equipment in the local unit will be assigned to this category or accumulated sale of specific products in a vending machine. Advance warning about imminent preventive maintenance can also be assigned to this category. A dump message will be transferred to the host computer when an alarm message is transferred, or at specific times or at more closely specified intervals. The transfer of dump messages can be specified in each case via the host computer and in principle for each individual microcontroller.

The type field which defines the above-mentioned message types is a compulsory component of the message matrix. Finally, the message matrix can also be generated with a description field which contains alphanumerical characters which represent the description of a specific message which is to be generated when a threshold value is reached or exceeded. The description field, however, is not transferred to the microcontroller, but only exists in the host computer and is intended to supply it with more descriptive information than that given by the code field.

The combination of different possibilities in each field in a message matrix can be categorized into certain principles for generating and transferring the messages. Whether all the principles can be used is dependent on the interface between the microcontroller and the local unit. The hardware options, i.e. sensors, detectors and the ability of the interface to handle data, can be a limiting factor, but if the microcontroller is substantially working in real time, the interface will not represent a restriction. Events can be recorded, logged, messages generated and transferred on a time basis, i.e. at specific intervals or at specific times. The rules for this do not need to be defined in the message matrix, but can be a general rule for each message matrix. This means that the microcontroller can be programmed to read a value for a particular event according to a defined schedule and to record each reading, while the information is transferred, for example, in the form of a dump message according to a fixed pattern. A second message principle states that a message should be generated when an accumulated number of events becomes equal to or exceeds the value specified by the threshold field. The information in the type field will then determine whether the message should be transferred immediately or stored in the microcontroller in anticipation that a second criterion for transfer will be fulfilled. Events which represent serious faults in the local unit or other conditions which require immediate action, will generally have a threshold value of one, i.e. it is sufficient for the event to occur only once. Less serious faults and problems can have a threshold value of two or more. A third principle is the grouping principle which means that a particular event actually represents more than one signal which is generated in the local unit and this is indicated by using a special character in the code field.

A fourth message principle is the interval principle which states that a threshold value alone is not sufficient to determine when a message should be generated, but the threshold must be related to something or other, either to elapsed time or the recording of other events monitored by the microcontroller. In a vending machine the recording of five sales in the course of an hour can illustrate this principle. Messages of this kind can also be generated on the basis of relations other than those connected with time, e.g. in relation to values for other events.

The so-called delay principle is used in order to evaluate whether it is necessary to transfer a generated message to the host computer. The transfer of the message will then be dependent on whether or not the second event occurs in the local unit within a certain assigned time frame which is specified in the type field. The microcontroller, e.g., can record a fault in the local unit, but if a second specific event occurs within a predetermined time, it will be interpreted to mean that no problem exists and therefore no error message is transmitted, but it is erased or can optionally be stored for subsequent retrieval.

Finally, the combination principle states that two or more events must occur simultaneously before a message is generated. The principle can be practical in vending machines where it can be used to indicate that the inventory of goods in the store in several separate storage compartments in the vending machine is low. The combination principle can also be used where other parameters affect the operation of the local unit. One example is an increase in temperature accompanied by an error message.

The software in the host computer comprises a module called a message matrix editor and it is implemented in order to handle, edit and transfer alarm parameters to the software which is stored in the microcontroller's memory. A message matrix editor contains all the parameters which are necessary to enable the microcontroller to monitor events and generate and transfer messages to the host computer. A message matrix can be installed in a large number of microcontrollers in the local units, but a microcontroller can only have one message matrix.

There now follows a description of how messages are generated and executed according to the present invention. The time for generating and/or transferring a message can be indicated when a specific event is recorded in the microcontroller or at a predetermined time or predetermined interval. Furthermore the generating and/or transferring of a message will be conditional on whether either a number of events are recorded which are equal to or exceed an absolute threshold value in the threshold field, an event is recorded which represents the occurrence of a grouping of specific individual events or a number of events are recorded which are equal to or exceed a relative threshold value in the threshold field and finally in connection with the recording of an event whether it is recorded that a further event takes place within a defined time interval calculated from the occurrence of the first event, or alternatively that a further event is not recorded within the defined interval.

As mentioned above, three types of messages are generated, but it is only the alarm message which is immediately transferred to the host computer. Messages which are either delayed or dump messages are stored and transferred either as a reaction to a polling or on the basis of a fixed routine. For example, messages which are not alarm messages can be transferred in connection with the automatic transfer of the alarm message. As examples of alarm messages in the present invention, mention should be made of alarm messages which it can be practical to implement if the local unit is a vending machine. These alarm messages may be, e.g., a message that the vending machine is sold out or about to be sold out of a particular commodity, a second alarm message informing that the amount of change coins is low and the amount of cash, i.e. payment for vended goods and services, is unusually high, and further an alarm message can be transmitted reporting on unusually high sales or possibly unusually low sales, either in total or of specific types of goods. An alarm message can also be transmitted warning about potential technical problems, e.g. when no sales have been effected from the vending machine over a predetermined lengthy period or that the vending machine has suffered a power loss a specific number of times within a predetermined period. An alarm message can also be transmitted warning about a deviation between payment inserted and the sales price of the type of commodity which is sold. In addition there are the usual alarm messages concerning tampering and attempts at illegal intrusion. In the latter case four levels can be used and these levels can be set in connection with normal modes for measures directed to the operation of the local unit, e.g. maintenance, service, refilling and the like.

Alarm messages can also be transmitted in connection with the need for maintenance, either acute or preventive, and this applies both to the actual vending machine and any coin unit or card reader provided in the vending machine. The message matrix in the microcontroller can, as mentioned, be modified from or via the host computer. After modification the modified message matrix will be routinely updated with data which are to be transferred from the microcontroller's memory, whereupon times and conditions for generating and transferring messages are once again defined.

Alarm messages will substantially be transferred automatically from the microcontroller to the host computer as soon as a condition exists in the local unit which requires an alarm message to be transferred, but automatic transfer can also be implemented according to a predetermined routine. The time for a first automatic transfer of a message is then determined, possibly modified from the host computer, and at the same time the intervals are also selected for subsequent automatic transfers and those data which it is desirable to include in these automatically transferred messages. Automatic transfer of messages of this kind can normally occur at 24 hour intervals, i.e. from one 24 hour period to the next.

Alarm messages may alert a service attendant, either a route man or a service technician, of imminent or actual conditions in remote local units that need immediate attention. A procedure shall now be described which will assure that the service attendant which is closest to the local unit needing service and in case of a vending machine the required merchandise, is directed to the local unit in question. The message transmitted to the local unit will include all pertinent information to make an efficient service call.

When an alarm is received on the host computer, a red coloured square is shown on the screen, and the alarm message is automatically entered into a message reception form that the host operator can access. The form shows the transmitting local unit's identification number, address of the local unit, the alarm's event code, its threshold level and a message description. The operator can access another screen that shows all pertinent information about the message, such as product inventory levels, sales forecasts, what time each product will be sold out, and the potential lost sales if the local unit is restocked at certain points in time.

Based on this information the operator can determine what action should be taken. If it is determined that the service attendant (route man in the case of restocking a vending machine) should change the route in order to service the local unit that sent the alarm message, the operator can transmit a message to a route man.

The host computer system or the control center will determine which route man should receive the message based on the following rules as particularly applied, for instance to vending machines, as follows:
a) The system will find the route man that is closest to the local unit by searching the data base for the last restocking messages received from each route man. The system will search for the route man that is closest to the local unit.
b) The system will search the truck loading list for that route man to see if he has enough spare inventory on the truck to service the local unit. The truck inventory is determined by deducting the number of product units that the route man has already taken from the truck inventory and stocked in other local units that day, from the truck inventory that he had at the start of the day. Every time a local unit is restocked, the controller in that unit will transmit to host its new inventory levels, sales since prior restocking and number of units restocked for each product. If the answer is yes, that route man will be selected to service the unit. the answer will be shown on the screen and the operator can approve or disapprove the selelction.
c) If the route man does not have the required inventory on the truck, or if the operator disapproves the selection by the system, the system will make another choice based on the rules in a).

The message will be transmitted through the wireless data communication system employed by the system to a radio modem in the route man's vehicle. The message includes information about the local unit's identification, location, and the exact amount of product units of each type of product that the route should restock in the local unit, and other pertinent data if needed (such as access times for instance). The route man will transmit back a message that he will accept the service order.

The remote local units need of course not be machines for vending of products. Is that the case, similar rules and messages may be specified according to alarm messages received, and the measures which then should be initiated.

If the local unit is coin operated, e.g. a vending machine, and in addition for this purpose includes an electronic coin unit, according to the present invention sensors are utilized in the local unit to record signals which represent the value of received coins, signals which represent the value of change coins and signals which represent the sales type. For this purpose the microcontroller includes a register for the supply of change coins in the vending machine, a register for the value of the amount of cash in the vending machine and a register for the cash value acquired in the sale of a commodity or service from the vending machine, these registers thus being updated on the basis of the signals recorded by the sensors and transmitted from the coin unit. After recording the signals from a coin unit and after the registers are updated, the microcontroller will access its message matrix in order to check whether one or more messages have been generated which have to be transferred to the host computer. When this has been done, the register for the cash value acquired during the sale will be set to zero in anticipation of a possible new sale.

According to the present invention unauthorized intrusion, tampering and break-in into a local unit are recorded, and an alarm message is simultaneously generated and transferred. As an example of how intrusion into a local unit can be recorded and how alarm messages are generated, an example will be presented based on the local unit being, for instance a vending machine which is attended by authorized personnel for maintenance and service. The vending machine is then equipped with a reader device which enables identification codes or commodity codes to be read from an identification unit with a code reader. For example, the service personnel are equipped with such an identification unit which at the same time also comprises a code reader, for example a bar code reader. During a service operation an operator will open the vending machine, which will result in an automatic interruption of the power supply, including also in the power supply to a coin unit provided in the vending machine, while the microcontroller's power supply is maintained and the microcontroller also records via the interface the time of the power failure. The operator will now place the microcontroller in a service mode by pressing a key or push-button while at the same time a light or sound signal or a combination of both is transmitted from the vending machine, with recording of the times in the microcontroller. Should this fail to happen within a predetermined time after the recorded time of the power interruption, the microcontroller will record it as a possible unauthorized intrusion and possibly transmit an alarm. In the implementation of this function, which is naturally optional, there are a number of possibilities both with regard to time intervals and the procedure for transferring the alarm message. If the operator is going to refill goods or maintain the vending machine, the identification unit of the person concerned must now be read by the microcontroller and this must be done in the course of a defined period after the microcontroller has been placed in service mode. If this reading is not performed in time, it could be recorded as a possible unauthorized intrusion and the microcontroller again generates an alarm message. In this connection the circumstances for generating and transferring an alarm message can again be determined via the host computer with a high degree of flexibility. It can be advantageous for the identification unit to include a bar code reader for reading bar codes for goods with which the vending machine has to be filled and it will then naturally combine the commodity code reading with the operator's identification. The identification should have an authorization which is already stored in the microcontroller's memory and if this authorization is lacking, an alarm code will again be generated.

Before leaving the vending machine after service or refilling, the operator should reset the microcontroller in operational mode and this means that he has to press a key one or more times. Once again this must be done within a predetermined period after the microcontroller has been placed in service mode and if this does not happen, an alarm could again be generated with the same flexibility as in the above-mentioned cases. If the vending machine contains a cash box, it must be removed for emptying or replaced with another cash box if this is necessary and the microcontroller is arranged in such a manner that it can detect that the cash box has been removed from the vending machine or the local unit. If the cash box is not in place in the course of a predetermined period, the microcontroller will record it as if the cash box has been illegally removed and again generate an alarm with the same flexibility as stated above.

The controller will be automatically set to operating mode when a certain, specified time, that can be set, modified and downloaded from the host computer system has elapsed since the unit was set in service mode, if it has not been set back to operating mode within the specified time frame. This will prevent the unit to stay in service mode if the route man should forget to set the unit back in operating mode when he leaves the local unit.

It will now be described in more detail how a monitoring and message generation in connection with filling and refilling of goods can be performed in a vending machine. This basically requires that a number of important parameters are specified from the host computer. Firstly, the total capacity for storing a commodity in the vending machine must be specified. The goods will normally be stored in a storage compartment for sale, called a sales store, but in addition the vending machine will also include a spare store for the same goods. It is further specified from the host computer which type of goods have first priority, second priority, and so on for placing in the spare store. The order of priority is of great but not decisive importance for which goods should be filled in the spare store. If a type of commodity with a higher priority than a second type of commodity is placed in the spare store, this can result in the need to refill at an earlier time than if the spare store was refilled with the second kind of commodity with a lower priority, and this is not desirable. Thus the order of priority should be considered as default. It is obvious that it is desirable to use the spare store principally for storing goods of which large quantities are sold. Moreover it should be specified how many units of a type of commodity the sales store can hold. In practice the sales store should consist of a number of storage compartments; in vending machines so-called columns are normally used, where each column contains a particular type of commodity, possibly several different types of commodity. Moreover it will be specified which type of commodity is contained in a specific storage compartment in the sales store and finally a minimum unit for filling a type of commodity must be defined. The minimum units may, for example, be crates, bottles or tins. If the minimum unit is a crate, the number of commodity units in the crate must be defined and this definition is transferred to the microcontroller. If the local unit is a vending machine, it should contain a safety or minimum store and the host computer will specify the number of units of each commodity which should be placed in the minimum store. The safety store is used together with a priority of the type of commodity and an estimation of the sale performed on the host computer in order to determine with which type of commodity a vending machine should be filled and how much of the type of commodity should be filled. Furthermore a sales parameter is estimated up to the next filling, and this estimate includes a decision on how much of each commodity should be filled in a vending machine. A parameter is also estimated for the sale on the following operational day, which parameter is used in a similar way, viz. for a decision on how much of a particular kind of commodity should be filled in the machine.

In order to be able to monitor the sale of a commodity and calculate the inventory according to the present invention two registers are used in the microcontroller, a first register being updated with sales data for each commodity between replenishment of the commodity and a second register being updated with sales data for each commodity between each time sales data are transferred to the host computer. The microcontroller records sales and transfers data concerning sales and inventory to the host computer. In this connection the amount of sales for a specific type of goods is stored in the microcontroller's memory together with the time of the sale. The host computer will automatically and routinely retrieve sales data from the microcontroller and input the data in the database in the host computer. A confirmation is transmitted from the host computer to the microcontrollers that the data have been entered in the database and the data are thereafter erased in the microcontroller's memory, thereby releasing capacity. The store level for each type of goods is also transferred from the microcontroller to the host computer, but these values are not erased in the microcontroller's memory, since they are required for monitoring whether the saleable store of a particular type of goods is above the level of the minimum store which is defined for the type of goods in question.

If the minimum unit is, for example, crates, the host computer will be able to calculate on the basis of the information from the microcontroller the requirement for the number of whole crates which need to be used for refilling the vending machine. In practice this means that if the need for replenishment of a particular type of commodity in the vending machine is calculated by the host computer, this will be done with due regard to the smallest unit used and defined packaging, such as boxes, tins, bags, bottles and the like and whether these are provided in crates or containers. Thus account is taken of the smallest unit used for the type of commodity and the packaging which is defined for the type of commodity.

Now it will be described in somewhat greater detail how certain thresholds of the above-mentioned message matrix may be updated when the method for monitoring according to the invention is applied to vending machine for vending commodities or products. These thresholds apply to the commodity inventory which is monitored in the local units, that is the vending machines, and will be termed the product recorder point (PRP). The value of a PRP which is contained in the threshold field of the message matrix, refers to a certain product inventory level in a vending machine and is used to alarm the host system when the actual inventory level equals the PRP, in which case it could be necessary to refill the vending machine with the commodity in question. As sales may vary with time in a fairly regular manner, this allows for an automatic method for dynamical updating of the PRPs. This method, as described below, implies that the message matrix of a remote local unit, i.e. the vending machine, is modified via the host computer in order to adapt a value of the threshold field, in this case the PRP, to reflect a change used for refilling of the commodity in regard of changes in the recorded sales of the commodity and/or a change in the predicted sale of the commodity based on a change in the rate of sale.

The host computer operator can enable or disable the function of automatic updating of the PRPs, by simply specifying in a field provided for that purpose which option should be employed in the host computer program. If the operator wants to enable the option, then a selection is made as to whether PRPs shall only be automatically updated in the host computer system, or if the option shall be enabled for automatic PRP updating in the local unit as well. If the operator selects to enable the latter option, this causes the new PRPs in the remote local units that meet a modification criterion to be automatically transmitted over the data communication network used by the system and to the remote local unit. If the operator selects to disable the function, the system will at the operator's discretion, report all the PRPs and the respective remote local units that have been updated on host computer since the same PRPs currently residing in local units were last downloaded to the latter, the date or dates of the last updating and the corresponding identification numbers of the remote local units.

The importance of this method is that a PRP always accurately reflects a commodity's inventory level relative to its daily sales volume forecast. The system maintains a PRP for a commodity that correctly reflects a corresponding inventory level as a predetermined percentage of the commodity's sales volume forecast, where the sales volume forecast is dynamically updated based on actual sales as mentioned above. The system will calculate new PRPs each time new sales data are received from the remote local units. The new PRPs are compared to the current PRPs and only when the change criteria are met, the PRPs will be updated, on the host computer and in the remote local units, depending on whether the operator has specified that this automatically shall be done, or not.

It is an important feature of this part of the invention that the operator can specify the criterion for when automatic updating of a PRP shall be done by the system. The criterion can be expressed as:

a change in the sales forecast, resulting in a change that is at least equal to a certain percentage (increase or decrease) compared to the current PRP, a change in the sales forecast resulting in a change that is at least equal to a certain absolute number of units (increase or decrease), or a combination of the two.

This method prevents updates to be made to PRPs when changes in sales volume is relatively small compared to the current sales volume, and for commodities with very small sales volumes compared to other commodities in the remote local units, saving data communication expenses for the operator.

In addition the invention provides for additional refinements as to how many PRPs should be updated in a remote local unit, when updating is done. For instance, in many remote local units, the ratio of sales volume to space or maximum inventory capacity may vary considerably. One particular commodity may have a considerably lower space to sales ratio than other commodities. Hence, the PRP for this commodity (leading commodity) will determine when the remote local unit needs to be visited for purposes of commodity restocking/refilling. The present invention thus allows the operator to specify whether only the new PRP for the leading commodity should be downloaded to the remote local unit, or if all PRPs that have changed more than specified by the change criteria since last downloading, also shall be downloaded to the remote local unit. This refinement allows the operator to control the data communication costs. For operators with several thousand remote local units in the field, this feature may considerably lower data communication costs over time.

As a further refinement, the operator can specify whether PRPs that have not met the change criteria described above, shall be downloaded to the remote local unit at the same time as the PRPs that have reached this criterion are being downloaded, or not.

It will now be described how the transmission of sales and inventory from a remote local unit based on target inventory levels may take place.

For purposes of storing periodic sales date and the most current product inventory levels from the remote local units, the units can be polled by the host computer system, upon which the units will transmit the data over the data communication network employed by the system. However, the invention may employ more than one data communication network, where some remote, local units will communicate through one particular network, and others may use a different network, and where the host computer system has the capabilities of communicating with all these units.

This is particularly important when wireless data networks are employed by the system, which is almost always the case when the remote local units are vending machines. On the host computer system, the operator will specify which remote local units communicate through which network. The host computer is linked to an X.25 leased or dial-up line, a packet data wire line communication network. Through this network, the data is transmitted to/from the wireless network to which the receiving/transmitting remote local unit is connected.

The reason for employing different wireless networks is that their radio coverage vary from one geographical location to another. Therefore, to be able to implement the system with all the remote local units that a user has in the field, more than one network may have to be employed.

The various wireless data communication networks use different data communication protocols, defining the data format requirements. The networks and their protocols also differ in respect to the network management capabilities offered. When the network facilities are advanced, the network will manage all the data packets being sent from several units to one particular receiving unit, storing them in the network until the receiving unit is ready to receive.

Other networks are not designed to facilitate these management functions, and when one unit wishes to receive data packets from several units, the most secure method is to manage the transmission from the receiving unit by having the receiving unit request the data from the sending units in a pre-established sequence, as already described.

In networks with advanced packet management facilities, it is more cost efficient to let the transmitting units initiate the transmission themselves. The procedure are applied by the present invention to minimize the transmission of sales and inventory data form the transmitting units for purposing of restocking the remote local units.

In the message matrix (MM) on host the operator can specify an I code for each commodity in the remote local unit, representing the inventory levels for the commodities when all commodity inventory levels and sales data shall be transmitted to the host system. The I code theshold levels can be set and updated in the same manner as the PRP threshold described above.

When the target inventory level represented by the I code is reached for a commodity in the remote local unit, the data packet with the inventory and sales data will be stored in the unit's microcontroller, until a preset point, e.g. a clock hour, when the packet will be transmitted. This clock hour may vary from unit to unit to avoid that a substantial number of units will transmit at the same time, but it will be set to a period during which the lowest possible traffic fees are charged by the network operators.

After this target inventory level is reached, the remote local unit will continue to send updated inventory and sales data every 24 hour until the unit is restocked, whereupon the I code thresholds will be reset, and the unit will not transmit until one of the I code thresholds once again is reached.

This method implies that a remote local unit may not transmit sales and inventory data for many 24 hour periods after it has been restocked, depending on sales volume. If the system user wants to assure the receipt of more frequent sales and inventory data, a parameter may be set and downloaded to the remote local unit, specifying how often the unit shall transmit those data. The unit will then transmit data with that frequency until the I code threshold is reached, upon which data will be transmitted every 24 hours until the unit is restocked. In the distributed system for supplying goods and services in which the present invention is used, there are included as mentioned local units, for example vending machines or service terminals, for supplying goods and services. The local units are not standardised or limited to specific types of local units, but will be adapted to the specific commodity or service which is supplied, even though it should be understood that a distributed system of this kind can include both vending machines and service terminals, since the present invention does not involve any restrictions either of the type of local unit or type of goods or types of service which are offered. A distinctive characteristic of the present invention, however, is that a dedicated microcontroller is employed and this means that the microcontroller must be able to be installed in the local unit and connected via an interface with components in the local unit without the necessity for any special measures or incurring particularly heavy costs. The installation of a microcontroller in a local unit, for example a vending machine, is illustrated in more detail in FIGS. 2(a)–(b). This shows that the local unit DRU includes a coin unit and a power supply which receives alternating current from the ordinary network. The power supply delivers direct voltage to the electronic units in the local unit DRU (data retrieval unit), including the microcontroller, the coin unit and a signal processing device in the form of an analog/digital converter for monitoring detected signal levels which are high/low respectively. In other words the detection is based on a binary logic. The coin unit in the local unit is connected to a microcontroller via a serial interface, for example of the type RS232 or a bus interface. The microcontroller will thereby be capable of determining the coin type used, whether a coin has been inserted in the coin unit, whether a coin has been dispensed from the coin unit or whether the inserted coin has been returned from the coin unit. The microcontroller simultaneously includes a number of detectors for detecting a validation of a sales price in the coin unit, a second detector for detecting sale of a commodity, a third detector for detecting whether the stock of a type of commodity is below a level which indicates that the vending machine VN is about to run out of this type of commodity and to detect when the vending machine has run out of this type of commodity, together with a fourth detector for detecting the amount of change coins in the coin unit. If the amount of change coins is low or zero, the microcontroller generates a signal which informs a user of the local unit, e.g. the vending machine. The analog/digital converter for signal processing is connected to or provided in the microcontroller.

Moreover the microcontroller is installed in such a manner that an interruption in the power supply will not take place if the local unit is opened, whether this occurs in an authorized manner or illegally. When the coin unit has validated a sales price, it will transmit a high signal to selector buttons on the front of the vending machine. The microcontroller is connected to a sensor which enables it to similarly detect a high signal and the microcontroller will sample all empty signal wires with a frequency of approximately 10 per second. This is achieved by means of a physical connection between the microcontroller's converter and each signal wire in the vending machine. If a high signal is read from one or more of the empty signal wires, i.e. that a storage compartment in the vending machine is empty, the sampling from this wire is discontinued.

The customer using the vending machine selects a type of commodity by pushing a selector button on the front of the vending machine. It should be understood that, depending on the model of the vending machine which is used, there could be a large number of buttons representing a comprehensive selection of commodities. When a selector button is pushed, a high signal is transmitted to a lamp which indicates an empty storage compartment. If the sale is not completed, the signal will revert to low while at the same time the selector signal reverts to low. If the sale is completed, the empty signal will remain high until the sale is completed. The microcontroller records a successful sale when some of the empty signals remain high for a specific number of samples, where the number of samples is determined by the model of the vending machine.

If there are still two or more units of the type of commodity in the storage compartment, the empty signal will revert to low after a certain number of seconds, the time being determined by the model of the vending machine, and it may have a maximum value or a minimum value. If the storage compartment is empty, i.e. there is actually only one unit of the type of commodity left, the empty signal will remain high until the storage compartment has been refilled. In order to detect that a storage compartment has run out of a type of commodity, the microcontroller will sample the empty signal from the empty signal wire to the storage compartment from which the product was supplied, after the validation signal for the sale has reverted to low. The microcontroller will record that a storage compartment is empty if the empty signals are still high after a specific sample in numerical order, where the numerical order is determined by the model of the vending machine. If the signal is low, it will be recorded that the storage compartment is not empty.

When the amount of change coins is about to run out, the coin unit will transmit a signal to the vending machine which means that only the correct amount can be inserted, and a signal will be turned on or an identification will appear on the front of the vending machine informing the user about this. When the signal reverts to high, the microcontroller will be able to read this by way of an interrupt process. The signal interface between the microcontroller and the local unit, in this case a vending machine, is illustrated schematically in FIG. 4.

The coin unit in the local unit contains its own memory for storing data concerning coin type, coins inserted and change coins or returned coins. The microcontroller can poll and store these data at specific times, in practice adapted to the need for monitoring and generating messages according to the present invention. The connection between the microcontroller and the sensors is performed via the analog/digital converter, the detection already described being based on a binary-logic detection of the type high/low, and thus digital 1/0 from the A/D converter to the microcontroller's logic.

Figure 3:
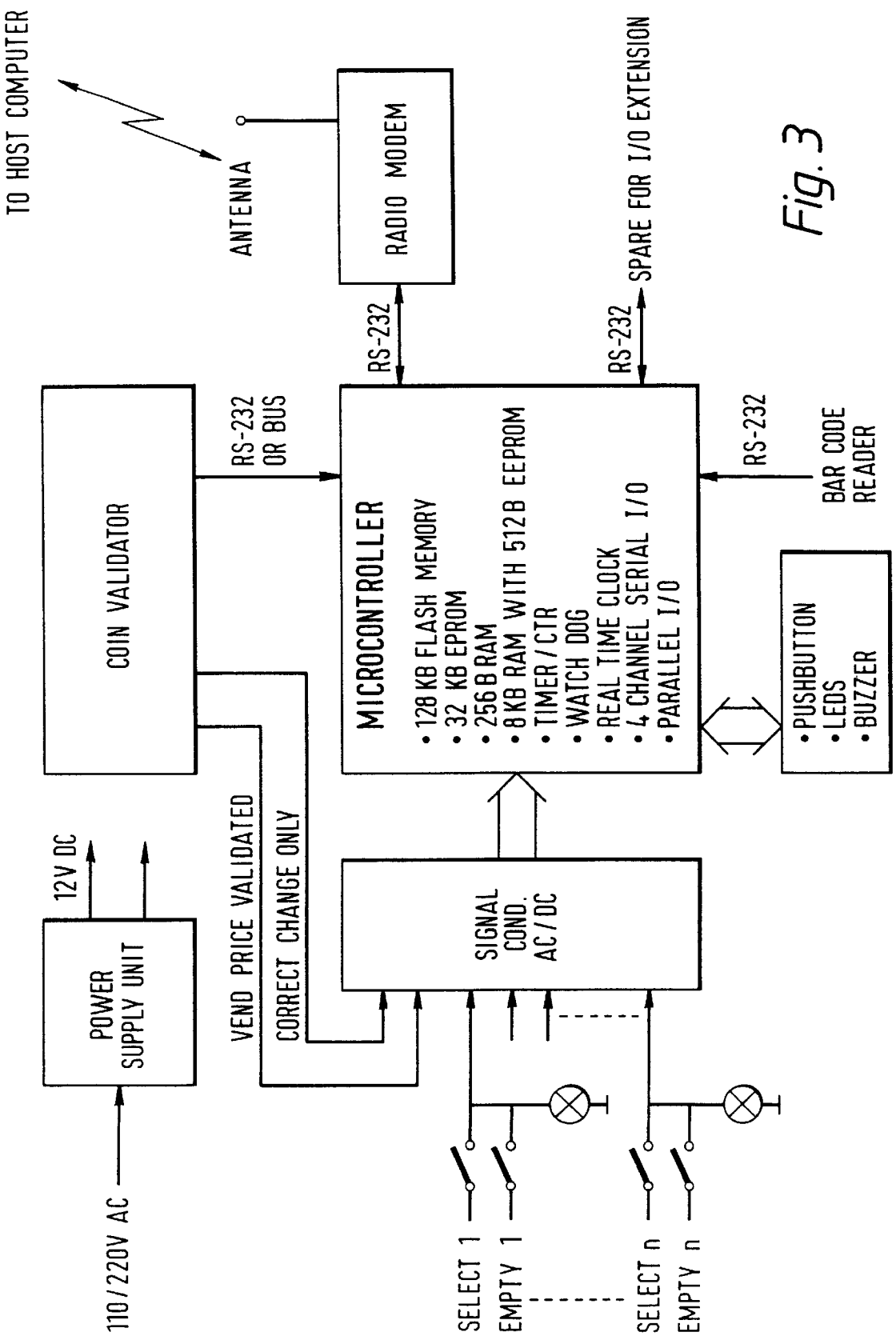

The microcontroller which is used in the present invention is designed as a universal microcontroller and can therefore be used with a number of different local units and vending machines. In order to facilitate the installation of the microcontroller according to the present invention it is preferably designed with surface-mounted components, and as was mentioned earlier, it should be noted that it does not have an integrated modem circuit, but employs external modems in order to communicate via a wire-based network or radio link network. For external communication the microcontroller uses serial interfaces, for example of the type RS232. As illustrated in FIG. 3, in this case the microcontroller is connected to a radio modem and also has an interface to a bar code reader which can be used for reading commodity codes or an identification unit. As already mentioned the microcontroller includes a memory, but this can be composed of a number of different memory circuits. As illustrated in FIG. 3, a 128K flash memory and a 32 KB EPROM are used. Software which is necessary for the operation of the microcontroller will normally be stored in the flash memory and the EPROM, while user software, for example parameters which require updating, message matrixes and service parameters, e.g. identification numbers, will be stored in an internal 512 byte EEPROM and an additional 8 KB RAM, which will make it easy to modify the parameters from the host computer. All the data which are collected via the interface or external sensors are stored in an internal read/write memory, here illustrated as a 256 byte RAM and are continuously updated as new data are collected.

It should be understood that it will be expedient to implement a large number of the functions, procedures and routines which are used in the present invention as software on either the host computer or in the microcontroller. Implementation and programming are naturally performed via the host computer which is connected to all the microcontrollers and with the use of the software modules in the host computer. The host computer's software is preferably implemented in a complicated language on a high level, for example, C, while the software in the microcontrollers and at any rate the control functions, as is normally known and preferred in the prior art, are implemented by way of a pure assembler.

The present invention provides a number of advantages in monitoring, generating and transferring messages in distributed systems for supplying goods and services. The particular point of difference between the present invention and the prior art is that it permits an interactive monitoring, an operator being able to control and adjust all the system parameters in the microcontroller from a host computer. This includes thresholds for alarm generation, inventories, refilling, communication procedures, including conditions and times for message transfer, together with authorization of service personnel.

Furthermore in the present invention a radio link-based communication system is employed and the host computer can with advantage use an operating system of the multitasking type and packet switching via an X.25 interface, thus enabling a number of microcontrollers to communicate simultaneously with the host computer. Even though this is prior art, it is not without significance, since large systems for supplying goods and services can have operational responsibility for several thousand local units, including vending machines or service terminals which preferably should report to the control center or the host computer in the course of a short period when the local units are not used or very little used, e.g. at night. The reporting should preferably also be performed at least once in the course of a 24 hour period, and a comprehensive system will therefore have a relatively great, temporary need for communication. According to the present invention a simple interface is also achieved between the microcontroller and the local unit, while at the same time the opportunity is offered for an optimum detection of the required parameters. A minimum of physical connections is used, thereby making installation and cabling costs substantially lower. No other sensors or relays are used than those which already constitute a part of the local unit or vending machine. The software which is stored in the microcontroller provides the necessary logic control of the monitoring, including alarms, sales information, stock information, maintenance information and security information which are to be transferred to the host computer.

Finally it should be noted that the present invention is orientated towards type of commodity or type of service. The orientation towards type or make of commodity is particularly advantageous in connection with vending machines, where a type of commodity can be stored in more than one storage compartment in the sales store, but where the present invention permits information to be obtained about the total stock and not the contents of a single storage compartment. Once again it is the microcontroller which keeps a check on in which storage compartment the type of commodity can be found. Reporting and presentation of data concerning the types of commodities are also performed according to type and make of commodity and not on the basis of the contents of the individual storage compartment. However, according to the present invention, information can be provided about the conditions in the individual storage compartment if this should be required. The special feature of the present invention is that in connection with the monitoring of a distributed system for supplying goods and services it includes a procedure for specifying, collecting and generating data concerning refilling requirements, a procedure for specifying, modifying and transferring message matrix parameters and effecting an interactive communication between the microcontroller and the host computer, a procedure for generating and reporting conditions in local units such as vending machines, including the need for maintenance and service, technical problems, inventories and empty stores as well as generating and transmitting messages concerning security, including the intrusion of unauthorized personnel, illegal procedures in connection with service and other tampering, a procedure for control of payment and handling of money and coins in a local unit based on coins or cash as a means of payment and finally a procedure for recording and reporting that unauthorized personnel have committed some kind of action in connection with the local unit.

Persons skilled in the art will realize that the flexibility obtained in using the present invention for monitoring and generating messages in a distributed system for supplying goods and services offers a great number of possibilities for efficient collection and operational monitoring of a system of this kind beyond those discussed herein, but which still fall within the scope of the invention as it is defined by the appended claims.

What is claimed is:

1. A method for monitoring a distributed system for supplying goods or services and generating messages concerning the state of the system and the supplied goods and services, wherein the system comprises a plurality of local units, particularly vending machines for supplying goods and services, wherein each local unit comprises sensors for detection of specified events in the local unit, wherein each local unit comprises a microcontroller with a memory, and wherein each microcontroller is connected to the sensors and via a communication system with a host computer in a control center, characterized in defining in each local unit the events which are to be monitored, the messages which are to be generated, when the messages are to be generated and when the messages are to be transferred from the local unit to the host computer, said definitions being stored in the microcontroller of each local unit in the form of a message matrix which may be accessed from the host computer, assigning at least one sensor for monitoring and recording of a defined event, assigning an absolute or relative threshold value for each defined event, storing the assigned threshold values in the microcontroller in each local unit, comparing the numerical value of a detection signal output by a sensor with the assigned threshold value, stating on the basis of the comparison and according to a predetermined execution routine if the value of the detection signal respectively is larger, equal or less than the assigned threshold value, generating a message on the basis of the comparison, transferring the message from the microcontroller to the host computer in the control center via the communication system, updating a database stored in the host computer on the basis of the content of the message, said data base being part of an information system for the local units and their operation, and initiating measures directed to the operation of the local units on the basis of the received message and with regard to predefined conditions stored in the host computer, the method being characterized in that the message matrix in the microcontroller can be modified via the host computer, the modified message matrix after the modification routinely being updated with data which are to be transmitted, whereupon times and conditions for generating and transmitting messages are determined.

2. A method according to claim 1, characterized in that if the generated message is an alarm message, it is transmitted immediately to the host computer.

3. A method according to claim 1, characterized in that if the generated message is not an alarm message, it is stored in the microcontroller and transmitted to the host computer either together with a first succeeding alarm message or when the host computer polls the microcontroller.

4. A method according to claim 1, characterized in that the message matrix of each local unit includes the definition of the events to be monitored, the messages to be generated and when the messages are to be transmitted from the local unit to the host computer, said definitions being stored in the form of records of the message matrix, wherein each record comprises the following mandatory fields:

a) a code field defining the events to be monitored as either a specific event or a grouping of a plurality of specific events;

b) a type field defining the message type; and further optionally one or both of the following fields:

c) a threshold field which on the basis of a particular threshold value defines when a message is to be generated, d) an interval field representing units of time or a number of recorded events.

5. A method according to claim 4, characterized in that the threshold values of the threshold field are absolute or relative, a relative threshold value being related to an interval value of the interval field, wherein the interval value may be a unit of time or a recorded number value.

6. A method according to claim 5, characterized in that the time of generating and/or transmitting a message is given respectively by a) a particular event being recorded, b) a predetermined time, c) a predetermined time interval, and the conditions for generating and/or transmitting a message respectively are given by i) recording a number of events which are equal or exceed an absolute threshold value of the threshold field, ii) recording an event which represents the occurence of a grouping of particular singular events, iii) recording a number of events being equal to or exceeding a relative threshold value of the threshold field, or iv) in connection with the recording of an event, recording or not recording that an additional event takes place within a predetermined time interval from the occurence of the first event.

7. A method according to claim 4, characterized in that the message type as defined by the type field is one of the following types a) an alarm message which is transmitted if there either is an error or a specific condition in the local unit, the first instance requiring immediate measures directed to the operation of the local unit and the second instance preventive maintenance or service of the local unit, b) a delayed message which is transmitted after a given time interval from the generation of the message, dependent on an event occurring or not occurring, c) a dump message which is transmitted informing about events or conditions which do not represent errors or problems in the local units and which normally do not require the initiation of measures directed to the operation of the local unit.

8. A method according to claim 7, characterized in that the message matrix in the microcontroller may be modified via the host computer, the modified message matrix after the modification routinely being updated with data which are to be transmitted, whereupon times and conditions for generating and transmitting messages are determined.

9. A method according to claim 8, characterized in the time of a first automatic transmission of a generated message from the microcontroller to the host computer being determined and modified via the host computer, the intervals between successive automatic transmissions as well as the data which are to be included in the transmissions, being selected simultaneously.

10. A method for recording of signals from an electronic coin unit in a local unit, particularly a vending machine, which is included in a distributed system for vending of goods and services, wherein the distributed system is monitored and messages about the condition of the system and the supplied goods and services are generated by means of a method according to claim 1, wherein the vending machine comprises a sensor for detection of specified events in the vending machines, wherein the vending machine comprises a microcontroller with a memory, wherein the microcontroller is connected to the sensors and via a communication system with a host computer in a control center, and wherein the microcontroller further is connected to the electronic coin unit via an interface and includes a register for the amount of change in the vending machine, a register for the value of the amount of cash in the vending machine and a register for the cash value acquired during the sale of goods and services from the vending machine, characterized in that the method comprises steps for by means of the sensors recording a signal which represents the value of a received coin, recording a signal which represents the value of a change coin and registering a signal which represents the type of sale, the register for the amount of change coins, the register for the value of the amount of cash and the register for the cash value acquired during the sale respectively simultaneously being updated on the basis of the signals transmitted from the coin unit.

11. A method according to claim 10, characterized in that the microcontroller after the recording of the signals from the coin unit and the updating of the registers of the microcontroller device, accesses a message matrix stored in the microcontroller in order to check whether one or more messages which are to be transmitted to the host computer, have been generated, whereupon the microcontroller sets the register for the cash value acquired during the sale to zero.

12. A method for recording and generating alarm message in case of an unauthorized intrusion in a local unit, particularly a vending machine, which is included in a distributed system for supplying goods and services, wherein the distributed system is monitored and messages generated about the condition of the system and the supplied goods and services by means of a method according to claim 1, wherein the local unit comprises a sensor for detection of specified events in the local unit, wherein the local unit comprises a microcontroller with a memory, wherein the microcontroller is connected to the sensors and via a communication system with a host computer in a control center, and wherein the microcontroller further is connected with an electronic coin unit via an interface which includes a control means for changing the operating mode of the microcontroller and a reader means for reading identification codes or commodity codes from an identification unit with a code reader, characterized in that the method comprises the following successive steps:

registering the time of an interruption of the power supply to the local unit, an interruption of the power supply being effected by opening the local unit while the power supply to the microcontroller simultaneously is maintained, activating the control means, the activation of the control means placing the microcontroller in a service mode, effecting the emission of an optical and/or acoustic signal in the local unit, recording the time of the activation of the control means and generating an alarm message if the activation does not take place within a predetermined term interval from the time of the recording of the power interruption, reading the identification unit in the reader means and generating an alarm message if the identification unit has not been read within a predetermined time interval from the time of the activation of the control means, whereupon measures in connection with the operation of the local unit and its maintenance may be initiated on the spot, said measures being concluded by once more activating the control for placing the microcontroller in an operating mode and generating an alarm message if the microcontroller has not been reset to the operating mode within a predetermined time interval from the time when it was placed in the service mode.

13. A method according to claim 12, wherein the local unit is a vending machine and the code reader of the identification unit is used for reading commodity codes by filling and refilling the vending machine with goods, characterized in that the identification code of the identification unit is read automatically simultaneously with the reading of the commodity code and compared with a list of authorized identification codes stored in the microcontroller, the microcontroller generating an alarm message if the identification code read is not an authorized identification code.

14. A method according to claim 12, wherein the local unit comprises a money box which may be removed for emptying or exchange with another money box, wherein the microcontroller is connected to a sensor for detecting the presence or absence of the money box, characterized in recording the time of removal of the money box and generating an alarm message if the moneybox has not been replaced or exchanged within a predetermined time interval from the time of its removal, removal/emptying and replacing/exchange only being capable of taking place when the microcontroller is in the service mode.

15. A method for filling/refilling of commodities in a vending machine, wherein the vending machine is included in a distributed system for supplying goods and services, wherein the distributed system is monitored and messages generated about the state of the system and the supplied goods and services by means of a method according to claim 1, wherein the vending machine comprises a sensor for detection of specified events in the vending machine, wherein the vending machine comprises a microcontroller with a memory, wherein the microcontroller is connected to the sensors and via a communication system with the host computer in a control center, wherein the vending machine comprises a customer-accessible sales store for each of the commodities to be sold and a spare store not being customer-accessible for the same commodities and wherein the sales store comprises a storage room for each of the commodities be sold, characterized in that the method comprises steps for specifying the total commodity capacity of the spare store, assigning a commodity a given priority, the priority according to predetermined conditions determining which commodity should be refilled in the spare store if the capacity of said spare store is not sufficient to contain a predetermined number of every commodity found in the vending machine, specifying the maximum inventory in each storage space in the sales store and transferring the specification to the microcontroller for storing in the memory, specifying the type of commodity which is contained in each storage space in the sales store and transferring the specification to the microcontroller for storing in the memory, defining a minimum unit used for filling a commodity and transferring the definition to the microcontroller for storing in the memory, estimating the expected sales of a commodity in the period of time from a message about the inventory of said commodity being transferred from the microcontroller and up to the succeeding filling of the commodity, said estimate forming the basis of a decision about the number of units of the commodity which are to be refilled, estimating the expected sales of a commodity in a predetermined period of operation, being counted from the time of the last filling of the commodity, said estimate forming the basis for a decision about the number of units of the commodity which are to be filled and further in connection with filling of commodities to record a number of filled units of a commodity in the sales store and the spare store by means of the microcontroller and transferring the number of units filled in the storage spaces from the microcontroller to the host computer, recording the sales of a unit of the commodity and transferring the number of units of the commodity being present after the sales to the host computer and storing the number of sales per type of commodity in the memory of the microcontroller, a first register of the microcontroller being updated with sales data for each commodity between the filling of the commodity and a second register in the microcontroller being updated with sales data for each commodity between each time sales data are transmitted to the host computer.

16. A method according to claim 15, characterized in a minimum unit for each type of commodity based on a packaging used for said commodity being defined via the host computer, the definition of the minimum unit being transferred to the microcontroller, and if the packaging according to the definition contains several units of said type of commodity, then the number of units which are contained in the packaging must also be defined and transferred to the control unit.

17. A method according to claim 15, wherein the vending machine further comprises a safety or minimum store, characterized in specifying the number of units of each commodity which are to be placed in the safety store via the host computer, the specified number being transmitted to the microcontroller which thereafter generates and transmits an order message to the host computer.

18. A method according to claim 16, characterized in the number of units of a commodity which are filled in the sale store and the emergency store being recorded in the microcontroller by means of a recording means operated by an operator.

19. A method according to claim 18, characterized in that the microcontroller after the filling of units of commodity in the store, computes the inventory of each commodity in respectively the sales and emergency store and transmits the result of the computation to the host computer.

20. A method according to claim 19, characterized in that the sale of a unit of a commodity is recorded, and that computed inventory of the type of commodity thereafter is reduced by one.

21. A method according to claim 20, characterized in that the number of sales of a commodity are stored together with the recording of the time of sale in the microcontroller memory and being polled automatically at predetermined times from the host computer for updating the data base of the host computer, the data transmitted thereafter being erased from the memory of the microcontroller.

22. A method according to claim 21, characterized in that requirement for filling of a particular type of commodity in the vending machines is computed by the host computer with regard to the minimum unit used and the packaging defined.

23. A device in a local unit, particularly a vending machine, in a distributed system for supplying goods and services, wherein the vending machines comprise a number of sensors for detection of specified events in the vending machine, an electronic coin unit and a microcontroller with a memory, wherein a microcontroller is connected to the sensors and the coin unit, wherein a method according to claim 10 is used in recording the signal of the electronic coin unit, monitoring the distributed system for supplying goods and services, and generating messages concerning the state of the system and the supplied goods and services, and wherein the microcontroller via a communication system is connected with a host computer in a control center, characterized in the coin unit being connected with the microcontroller via a serial interface or a bus interface in order to determine the type of coin, the insertion of a coin in the coin unit, the delivery or return of coins from the coin unit, the microcontroller comprising a first detector for detecting a validation of sales price in the coin unit, a second detector for detecting the sale of a commodity, a third detector for detecting whether the inventory of a type of commodity is below a level which indicates that vending machine is about to be emptied in regard of said type of commodity and for detecting when the vending machine is empty of said type of commodity, as well as a fourth detector in order to detect the amount of change coins in the coin unit, the microcontroller if the amount of change coins is low or equals zero generating a signal which informs a user of the vending machine.

24. A device according to claim 23, characterized in the coin unit comprising its own memory for storing of data concerning the type of coin, the inserted coin and change coin or returned coin, said microcontroller polling and storing these data at predetermined or suitable times.

25. A device according to claim 23, characterized in the microcontroller comprising an analog/digital converter with a number of inputs for signal processing of detection signal from the detectors, each of said detectors being connected to a respective input of the converter.

26. A device according to claim 25, characterized in the detection being based on the use of a binary logic signal level of the type high/low.

27. A device according to claim 23, characterized in the microcontroller being a universal microcontroller.

28. A device according to claim 27, characterized in the universal microcontroller being designed with surface mounted components.

29. A method for recording and generating an alarm message in case of an unauthorized intrusion in at least one of a plurality of local units, particularly a vending machine, which is included in a distributed system for supplying goods and services, wherein the distributed system is monitored and messages generated about the condition of the system and the supplied goods and services, characterized in defining in each local unit events which are to be monitored, the messages which are to be generated, when the messages are to be generated, and when the messages are to be transferred from the local unit to a host computer, said definitions being stored in a microcontroller of each local unit in the form of a message matrix which may be accessed from the host computer, assigning at least one sensor for monitoring and recording of a defined event, assigning an absolute or relative threshold value for each defined event, storing the assigned threshold values in the microcontroller in each local unit, comparing the numerical value of a detection signal output by a sensor with the assigned threshold value, stating on the basis of the comparison and according to a predetermined execution routine if the value of the detection signal respectively is larger, equal, or less than the assigned threshold value, generating a message on the basis of the comparison, transferring the message from the microcontroller to the host computer in a control center via a communication system, updating a database stored in the host computer on the basis of the content of the message, said data base being part of an information system for the local units and their operation, and initiating measures directed to the operation of the local units on the basis of the received message and with regard to predefined conditions stored in the host computer, wherein the local unit comprises a sensor for detection of specified events in the local unit, wherein the local unit comprises the microcontroller with a memory, wherein the microcontroller is connected to the sensors via the communication system with the host computer in the control center, and wherein the microcontroller further is connected with an electronic coin unit via an interface which includes a control means for changing the operating mode of the microcontroller and a reader means for reading identification codes or commodity codes from an identification unit with a code reader, characterized in that the method comprises the following successive steps:

registering the time of an interruption of power supply to the local unit, an interruption of the power supply being effected by opening the local unit while the power supply to the microcontroller simultaneously is maintained, activating the control means, the activation of the control means placing the microcontroller in a service mode, effecting the emission of an optical and/or acoustic signal in the local unit, recording the time of the activation of the control means and generating an alarm message if the activation does not take place within a predetermined time interval from the time of the recording of the power interruption, reading the identification unit in the reader means and generating an alarm message if the identification unit has not been read within a predetermined time interval from the time of the activation of the control means, whereupon measures in connection with the operation of the local unit and its maintenance may be initiated on-the-spot, said measures being concluded by once more activating the control means for placing the microcontroller in an operating mode and generating an alarm message if the microcontroller has not been reset to the operating mode within a predetermined time interval from the time when it was placed in the service mode.

30. A method for recording and generating an alarm message in case of an unauthorized intrusion in a local unit, particularly a vending machine, which is included in a distributed system for supplying goods and services, wherein the distributed system is monitored and messages generated about the condition of the system and the supplied goods and services, wherein the local unit comprises a sensor for detection of specified events in the local unit, wherein the local unit comprises a microcontroller with a memory, wherein the microcontroller is connected to the sensors via a communication system with a host computer in a control center, and wherein the microcontroller further is connected with an electronic coin unit via an interface which includes a control means for changing the operating mode of the microcontroller and a reader means for reading identification codes or commodity codes from an identification unit with a code reader, characterized in that the method comprises the following successive steps:

registering the time of an interruption of the power supply to the local unit, an interruption of the power supply being effected by opening the local unit while the power supply to the microcontroller simultaneously is maintained, activating the control means, the activation of the control means placing the microcontroller in a service mode, effecting the emission of an optical and/or acoustic signal in the local unit, recording the time of the activation of the control means and generating an alarm message if the activation does not take place within a predetermined time interval from the time of the recording of the power interruption, reading the identification unit in the reader means and generating an alarm message if the identification unit has not been read within a predetermined time interval from the time of the activation of the control means, whereupon measures in connection with the operation of the local unit and its maintenance may be initiated on-the-spot, said measures being concluded by once more activating the control means for placing the microcontroller in an operating mode and generating an alarm message if the microcontroller has not been reset to the operating mode within a predetermined time interval from the time when it was placed in the service mode.

31. A method for filling/refilling of commodities in a vending machine, wherein the vending machine is included in a distributed system for supplying goods and services, wherein the distributed system is monitored and messages generated about the state of the system and the supplied goods and services, wherein the vending machine comprises a sensor for detection of specified events in the vending machine, wherein the vending machine comprises a microcontroller with a memory, wherein the microcontroller is connected to the sensors and via a communication system with a host computer in a control center, wherein the vending machine comprises a customer-accessible sales store for each commodity to be sold and a spare store not being customer-accessible for the same commodities and wherein the sales store comprises a storage room for each of the commodities to be sold, characterized in that the method comprises steps for specifying the total commodity capacity of the spare store, assigning a commodity a given priority, the priority according to predetermined conditions determining which commodity should be refilled in the spare store if the capacity of said spare store is not sufficient to contain a predetermined number of every commodity found in the vending machine, specifying the maximum inventory in each storage space in the sales store and transferring the specification to the microcontroller for storing in the memory, specifying the type of commodity which is contained in each storage space in the sales store and transferring the specification to the microcontroller for storing in the memory, defining a minimum unit used for filling a commodity and transferring the definition to the microcontroller for storing in the memory, estimating the expected sales of a commodity in the period of time from a message about inventory of said commodity being transferred from the microcontroller and up to the succeeding filling of the commodity, said estimate forming the basis of a decision about the number of units of the commodity which are to be refilled, estimating the expected sales of a commodity in a predetermined period of operation, being counted from the time of the last filling of the commodity, said estimate forming the basis for a decision about the number of units of the commodity which are to be filled, and further in connection with filling of commodities to record a number of filled units of a commodity in the sales store and the spare store by means of the microcontroller and transferring the number of units filled in the storage spaces from the microcontroller to the host computer, recording the sales of a unit of the commodity and transferring the number of units of the commodity being present after the sales to the host computer and storing the number of sales per type of commodity in the memory of the microcontroller, a first register of the microcontroller being updated with sales data for each commodity between the filling of the commodity and a second register in the microcontroller being updated with sales data for each commodity between each time sales data are transmitted to the host computer.

* * * * *